3,790,532
NOVEL CURED EPOXY RESIN COMPOSITION
Hideo Fukutani and Makoto Tokizawa, Tokyo, and Hiroyoshi Okada, Kawasaki, Japan, assignors to Mitsubishi Chemical Industries, Ltd., Tokyo, Japan
No Drawing. Filed Aug. 2, 1971, Ser. No. 168,488
Claims priority, application Japan, Aug. 28, 1970, 45/75,446
Int. Cl. C08f 3/62; C08g 30/12
U.S. Cl. 260—78.4 EP    4 Claims

ABSTRACT OF THE DISCLOSURE

A cured epoxy resin composition is prepared by curing an ester of dicarboxylic acid containing epoxy radicals. The cured epoxy resin composition has high tracking resistance, good arc resistance, and high impact strength, and is particularly useful for casting of electrical parts.

BACKGROUND OF THE INVENTION

Field of invention

This invention relates to a novel cured epoxy resin composition and more particularly, it relates to a cured epoxy resin composition which has broad utility such as for the preparation of various molded articles, adhesives, paint and varnish, laminates, reinforced composites, coatings, and particularly for casting of electrical parts, such as high voltage electrical parts, insulators, outdoor bushings, transformers, etc.

Description of prior art

In order to provide an epoxy resin which is useful for the preparation of electrical parts, it must be characterized by high tracking resistance, high arc resistance, good out-door weather durability and high impact strength and thermal shock resistance. The alicyclic epoxy resins have been contemplated for this utility; however, conventional alicyclic epoxy resins, such as the vinylcyclohexene diepoxides, are generally characterized by an undesirably low cracking resistance. Other conventional epoxy resins, such as bisphenol A and epichlorohydrin reaction products have also been contemplated to satisfy this need. However, those resins have been found to have undesirably low tracking resistance and low weather durability.

A need exists, therefore, for an epoxy resin having the above-mentioned desirable electrical and physical properties.

SUMMARY OF THE INVENTION

Accordingly, it is one object of this invention to provide a cured epoxy resin composition having high tracking resistance, good arc resistance and good weather durability, high impact strength and good thermal shock resistance.

It is another object of this invention to provide a cured epoxy resin composition which can be satisfactorily used in the preparation of electrical parts.

These and other objects have now been attained by providing an epoxy resin composition prepared by curing an ester of a dicarboxylic acid containing epoxy radicals having the general formula:

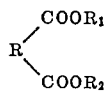

wherein R represents a divalent alicyclic, aromatic or aliphatic residual radical; and $R_1$, $R_2$ each represent a radical selected from the group of monoepoxyoctyl, diepoxyoctyl, monoepoxyoctenyl, methylglycidyl and glycidyl, with the proviso that $R_1$ and $R_2$ may not both be methylglycidyl or glycidyl.

DETAILED DESCRIPTION OF THE INVENTION

In the general formula of the dicarboxylic acid ester containing epoxy radicals, R is preferably a radical selected from the group of cyclohexyl, epoxycyclohexyl, methylcyclohexyl, methylepoxycyclohexyl, norbornanyl, methylnorbornanyl, epoxynorbornanyl and methylepoxynorbornanyl. Exemplary of the compounds which may be used in forming the composition of this invention include the epoxy diesters of di-valent alicyclic carboxylic acids, such as di(diepoxyoctyl) ester of hexahydrophthalic acid, di(monoepoxyoctyl) ester of hexahydrophthalic acid, monoepoxyoctyl-diepoxyoctyl ester of hexahydrophthalic acid, monoepoxyoctyl-monoepoxyoctenyl ester of hexahydrophthalic acid, monoepoxyoctyl-glycidyl ester of hexahydrophthalic acid, diepoxyoctyl-glycidyl ester of hexahydrophthalic acid, monoepoxyoctyl-methylglycidyl ester of hexahydrophthalic acid, di(diepoxyoctyl) ester of epoxycyclohexane-dicarboxylic acid, di(monoepoxyoctyl) ester of epoxycyclohexane-dicarboxylic acid, monoepoxyoctyl-diepoxyoctyl ester of epoxycyclohexane-dicarboxylic acid, monoepoxyoctyl-monoepoxyoctenyl ester of epoxycyclohexane-dicarboxylic acid, monoepoxyoctyl-glycidyl ester of epoxycyclohexane-dicarboxylic acid, diepoxyoctyl-glycidyl ester of epoxycyclohexane-dicarboxylic acid, monoepoxyoctyl-methylglycidyl ester of epoxycyclohexane dicarboxylic acid, di(diepoxyoctyl) ester of methylhexahydrophthalic acid, di(diepoxyoctyl) ester of norbornane-dicarboxylic acid, di(diepoxyoctyl) ester of methylnorbornane-dicarboxylic acid, di(diepoxyoctyl) ester of epoxynorbornane-dicarboxylic acid, di(diepoxyoctyl) ester of norbornane-dicarboxylic acid; the epoxy diesters of di-valent aliphatic carboxylic acids, such as di(diepoxyoctyl) ester of maleic acid, di(monoepoxyoctyl) ester of maleic acid, monoepoxyoctyl-diepoxyoctyl ester of maleic acid, monoepoxyoctyl-monoepoxyoctenyl ester of maleic acid, monoepoxyoctyl-glycidyl ester of maleic acid, diepoxyoctyl-glycidyl ester of maleic acid, di(diepoxyoctyl) ester of oxalic acid, di(diepoxyoctyl) ester of fumaric acid, di(diepoxyoctyl) ester of succinic acid, di(diepoxyoctyl) ester of glutaric acid, di(diepoxyoctyl (ester of adipic acid; and the epoxy diesters of divalent aromatic carboxylic acids, such as di(diepoxyoctyl) ester of phthalic acid, di(monoepoxyoctyl) ester of phthalic acid, monoepoxyoctyl-monoepoxyoctenyl ester of phthalic acid, monoepoxyoctyl-glycidyl ester of phthalic acid, diepoxyoctyl-glycidyl ester of phthalic acid, di(diepoxyoctyl) ester of isophthalic acid, and di(diepoxyoctyl) ester of terephthalic acid. It is especially preferable to use a diester of an alicyclic carboxylic acid, especially those esters having at least one diepoxyoctyl, monoepoxyoctyl or epoxyoctenyl radical.

The epoxy radical containing esters of carboxylic acid can be produced by various processes. For example, the esters can be produced by reacting a corresponding dicarboxylic acid, anhydride or salt thereof, with a corresponding epoxy alcohol or epihalohydrin. These esters can alternatively be produced by reacting the corresponding carboxylic acid or anhydride thereof, with an unsaturated alcohol, such as octadienol, octenol, crotyl alcohol or allyl alcohol, and then epoxidizing the product with an epoxidizing agent, such as a peroxide or a peracid.

Still another way of producing the esters is by reacting the corresponding carboxylic acid, or anhydride thereof, with said unsaturated alcohol and an epoxy alcohol, such as glycidol, or methyl-glycidol, to prepare a mono-ester of said dicarboxylic acid, reacting the salt of said mono-ester with an epihalohydrin, such as epichlorohydrin or methylepichlorohydrin, and then epoxidizing the product with an epoxidizing agent, such as a peroxide or a peracid.

Suitable di-valent carboxylic acids used for this process include the saturated or unsaturated alicyclic carboxylic acids, such as tetrahydrophthalic acid, hexahydrophthalic acid, nadic acid, methylnadic acid, dihydronadic acid, methyldihydronadic acid; the saturated or unsaturated aliphatic carboxylic acids, such as oxalic acid, malonic acid, maleic acid, fumaric acid, succinic acid, glutaric acid, and adipic acid; and the aromatic dicarboxylic acids, such as phthalic acid, isophthalic acid or terephthalic acid.

Suitable octadienol include 1,7-octadienol-3, and 2,7-octadienol-1, which can easily be obtained by reacting 1,3-butadiene with acetic acid in the presence of a catalyst containing a di-valent palladium compound, such as palladium acetate, and a phosphine compound, such as triphenylphosphine and then hydrolyzing the resultant octadienyl ester of acetic acid.

The octenols can be produced by hydrogenating an octadienol. Suitable octenols include 1-octenol-3, 7-octenol-3,2-octenol-1, and 7-octenol-1.

The epoxy radical can be introduced into the carboxylic acid-unsaturated alcohol ester by any conventional process such as by using a peracid epoxidizing agent, such as peracetic acid, performic acid, permono maleic acid, perpropionic acid, percrotonic acid, permonophthalic acid, perbenzoic acid or permonomaleic acid in an amount of 0.1–2.5 times the theoretical amount necessary for epoxidation, at temperatures of from $-20-80°$ C., preferably 0–60° C.

In order to obtain good yields of epoxy compound, it is necessary to epoxidize at a moderate temperature, preferably 0–60° C., and to keep reaction time as short as possible. Strong acids, which can catalyze the cleavage of the epoxy radicals, should be excluded such as by neutralization or the like.

Where the epoxidation reaction is carried out in a solvent, such as cyclohexane, n-hexane, benzene, toluene, xylene, ether, chloroform, 1,2-dichloroethane, carbon tetrachloride and methylene dichloride, ring cleavage of the epoxy radical can be effectively prevented.

It is possible to hydrogenate those esters of dicarboxylic acid containing the epoxy radicals, which have an olefinic unsaturated bond, such as di(epoxyoctenyl) ester of dicarboxylic acid, epoxyoctyl-epoxyoctenyl ester of dicarboxylic acid, epoxyoctenyl-glycidyl ester of dicarboxylic acid, epoxyoctenyl-methylglycidyl ester of dicarboxylic acid, or epoxyoctyl-octadienyl ester of dicarboxylic acid. Such hydrogenation can be accomplished in the presence of a Group VIII metal or derivative thereof, supported on a carrier. Suitable Group VIII catalysts include Pd, Pt, Ru, Rh, Raney nickel or $PtO_2$. Any carrier conventionally used for hydrogenation may be used, such as activated carbon, aluminum oxide, titanium oxide, calcium oxide, silica, or magnesium oxide. In order to support the catalyst on the carrier, it is usual to impregnate the carrier with an aqueous solution of the metal salt, or, alternatively, a granular mixture of catalyst and carrier can be prepared.

Hydrogenation may be conducted in the absence of a solvent; however, it is preferable to conduct the hydrogenation in the presence of an inert solvent, such as cyclohexane, hexane, methylalcohol, ethylalcohol, tetrahydrofuran, tetrahydropyran, dioxane, diethylether, chloroform or methylene chloride, at 0–150° C., preferably up to 120° C. The hydrogen pressure is not limited, but is preferably within the range of 1–150 kg./cm.² The hydrogen can be diluted with an inert gas, such as $N_2$ or Ar.

It is preferable that the dicarboxylic acid ester containing the epoxy radicals have a high epoxy value of more than 0.40 mole equivalent/100 g., and a low hydroxyl value of up to 0.15 mole equivalent/100 g.

The cured epoxy resin composition of this invention can be prepared by curing one or more of the esters. Curing can be conducted in the presence of a curing agent, although the use of a curing agent is optional. When a curing agent is used, conventional curing agents will suffice, such as the polyamines, e.g., diethylenetriamine, tetraethylenepentamine, m-phenylene-diamine, and PP-diaminodiphenylmethane; or the adducts of polyamines and acrylonitrile or phenylglycidyl ester. It is possible to use, as the curing agent, any of the acid anhydrides, such as phthalic anhydride, hexahydrophthalic anhydride, maleic anhydride, succinic anhydride, HET acid anhydride, tetrahydrophthalic anhydride, dodecylsuccinic anhydride, pyromellitic anhydride, nadic anhydride methylnadic anhydride and benzophenonic anhydride or mixture of said acid anhydride and accelerator of a tertiary amine such as N,N-dimethylbenzylamine, or tris(dimethyl-aminomethyl)phenol.

The use of an acid anhydride is especially preferred as the curing agent, particularly where the composition is intended to be used in the preparation of electrical parts. When a curing agent is used, good results are obtainable with amounts of 0.6–1.1 equivalent, and especially 0.75–0.95 equivalent of epoxy value in the epoxy compound. Where curing is conducted in the absence of a curing agent, it is nonetheless desirable to cure in the presence of a Lewis acid or base, such as trifluoroboran dietherate or zinc alkoxide. The curing condition will depend upon the presence or absence of a curing agent and the types of curing agents, and/or accelerators which are used. Good results are usually obtained at room temperature to 160° C. for periods of several minutes to several tens of hours.

Fillers may be incorporated into the final product, such as fibrous filler, alumina, silica, talc, aluminum powder, asbestos or other inorganic and/or organic powders. It is also possible to add other conventional epoxy resins to the product or to add a diluent, a conventional plasticizer, such as azelaic acid, sebacic acid, and polyalkylene glycol, or a coloring agent.

The cured epoxy resin compositions of this invention are characterized by excellent chemical resistance, and can be used for preparing molded articles, paints, varnishes and adhesives, reinforced composites, laminates, coating powders, boaning, especially for electrical parts, because of its high weather durability, good arc resistance, good tracking resistance, and low variability of dielectric constant at high temperatures.

Having now generally described the invention, a further understanding can be obtained by reference to certain specific examples which are provided herein for purposes of illustration only and are not intended to be limiting in any manner.

In the examples, the epoxy value is shown as mole equivalent/100 g. and the hydroxyl value is shown as mole equivalent/100 g. The iodine value is shown as $I_2$ g.×100/g. The crack resistance of the cured epoxy resin composition was tested by casting the composition with a washer. The absence of cracking is indicated as "good."

EXAMPLE 1

386 g. of di(2,7-octadienyl-1) ester of tetrahydrophthalic acid and 650 ml. of chloroform were charged to a flask and were dissolved, while stirring at 8° C. 600 g. of 40% of peracetic acid solution wherein sulfuric acid residue was preliminarily neutralized with anhydrous sodium acetate, was added dropwise into the flask at up to 10° C. After the addition was completed, the contents were continuously stirred at 22° C. for 3.5 hours. The unreacted peracetic acid, hydrogen peroxide, and acetic acid were removed by washing with water and the chloroform was distilled off to yield an epoxy compound. The yield was 412 g. The epoxy value measured by tetraethylammonium bromodiperchloric acid method, was 0.57. The iodine value, measured by I Cl method, was 140.

400 g. of the resulting epoxy compound, 1 liter of methanol, 1.50 g. of palladium catalyst having 3 weight percent Pd on an activated carbon carrier, were charged to an autoclave. After the substitution with $N_2$ gas, 25 kg./cm.$^2$ of hydrogen pressure was changed and hydrogenation reaction was carried out at 30° C. for 2 hours, with stirring. After completing the reaction, the catalyst was filtered and methanol was distilled. The product was dried at 60° C., under a reduced pressure of 1 mm. Hg, for 5 hours.

401 g. of the epoxy compound, having an epoxy value of 0.55, a hydroxy value of 0.06 and an iodine value of 10, was obtained. The resulting hydrogenated epoxy ester and hexahydrophthalic anhydride of 0.85 mole equivalent to epoxy radical of said epoxy ester and benzyldimethylamine of 5 parts by weight per 100 parts of said epoxy ester, were mixed and cured at 100° C. for 3 hours, and then further cured at 150° C. for 4 hours. The crack resistance of the resulting epoxy resin composition was tested by curing the epoxy resin composition with a washer having an outer diameter of 3.20 cm. and an inner diameter of 1.07 cm. The composition could be cast without any cracking.

The arc resistance test of the epoxy resin composition under ASTM D 495 showed an arc holding time of 150 sec. For comparison, the arc holding time of epichlorohydrin-bisphenol A type epoxy resin, available commercially, is 50 sec.

EXAMPLE 2

386 g. of di(octadienyl)ester of tetrahydrophthalic acid (2.7 octadienyl-1:1, 7-octadienyl-3=80:20), and 650 ml. of methylene dichloride were charged to a flask. 650 g. of 40% of peracetic acid solution, wherein 26 g. of sulfuric acid residue was neutralized with anhydrous sodium acetate, was added dropwise into the flask, while stirring, at 10 C. The contents were then continuously stirred at 20° C. for 3.5 hours. The unreacted peracetic acid, acetic acid and hydrogen peroxide were removed by washing with water, and methylene dichloride was distilled off to yield 414 g. of epoxy compound having an epoxy value of 0.57, a hydroxyl value of 0.04, and an iodine value of 134.

400 g. of the above epoxy compound, 1 l. of methanol and 1.20 g. of a catalyst having (5 weight percent rhodium supported on an activated carbon carrier) were charged to an autoclave and 25 kg./cm.$^2$ of hydrogen pressure was changed. After hydrogenation for two hours, as in Example 1, an epoxy compound having an epoxy value of 0.57, a hydroxyl value of 0.04, and an iodine value of 10 was obtained. The resulting epoxy compound was cured with nadic anhydride, as a curing agent, according to Example 1, to obtain a molded article, in which a washer was filled, without cracking. The arc resistance test of this epoxy resin composition showed a 150 sec. holding time.

EXAMPLE 3

388 g. of di(2,7-octadienyl-1) ester of hexahydrophthalic acid, and 1200 ml. of methylene dichloride were charged to a flask. 605 g. of 42% peracetic acid solution, wherein sulfuric acid was neutralized with anhydrous sodium acetate, was added dropwise into the flask, with vigorous stirring at up to 30° C. Following this addition, the contents were further reacted for 3.5 hours with stirring. The unreacted peracetic acid, acetic acid and hydrogen peroxide were removed by washing with water. An epoxy compound having an epoxy value of 0.516, a hydroxyl value of 0.045 and an iodine value of 82 was obtained.

Hydrogenation, according to Example 2, was accomplished by using a methylene dichloride solution of said epoxy compound and 2.0 g. of catalyst (5 weight percent of rhodium on an activated carbon carrier) to yield 416 g. of epoxy compound, having an epoxy value of 0.50, a hydroxyl value of 0.05 and an iodine value of 14. The hydrogenated epoxy compound was cured with hexahydrophthalic anhydride, as a curing agent, according to Example 1, to obtain a molded article in which a washer was filled, without cracking. The arc resistance test of said epoxy resin composition showed 150 sec. of holding time.

EXAMPLE 4

383 g. of di(octadienyl) ester of hexahydroterephthalic acid (2,7 - octadienyl - 1:1,7 - octadienyl - 3=80:20), 1200 g. of methylene dichloride were charged to a flask and then 726 g. of 41% peracetic acid solution was added dropwise, according to Example 3, and then the contents were further reacted at 35° C. for 2 hours to yield 416 g. of epoxy compound having an epoxy value of 0.59, a hydroxyl value of 0.04, and an iodine value of 57. 200 g. of said epoxy compound, 200 ml. of methanol and 1.0 g. of catalyst (5 weight percent of rhodium on an activated carbon carrier) were charged to an autoclave and hydrogenated according to Example 2 to yield an epoxy compound having an epoxy value of 0.58, a hydroxyl value of 0.05, and an iodine value of 13. The resulting epoxy compound was cured with hexahydrophthalic anhydride, as a curing agent, according to Example 1, to obtain a molded article in which a washer was filled, without cracking. The arc resistance test for said epoxy resin composition showed a holding time of more than 150 sec.

EXAMPLES 5 AND 6

In accordance with the process of Example 1, (2,7-octadienyl-1)ester of tetrahydrophthalic acid(*5) and di(2,7 - octadienyl - 1)ester of hexahydrophthalic acid-(*6) were respectively epoxidized and hydrogenated, and then the resulting epoxy compounds were respectively cured with hexahydrophthalic acid as a curing agent.

The results were as follows:

| Experiment | Epoxy compound | | | | Curing agent mole equivalent to epoxy radical | Arc resistance holding time (sec.) | Crack resistance |
| | Ester | Epoxy value | Hydroxy value | Iodine value | | | |
| --- | --- | --- | --- | --- | --- | --- | --- |
| 5 | *5 | 0.61 | 0.04 | 58 | 0.75 | 150 | Good. |
| 6 | *6 | 0.55 | 0.04 | 15 | 0.85 | <150 | Do. |

EXAMPLES 7–9

In accordance with the process of Example 1, di(2,7-octadienyl-1)ester of nadic acid(*7), di(2,7 - octadienyl-1)ester methyl nadic acid(*8), and di(2,7 - octadienyl-1)ester of dihydro-nadic acid(*9) were respectively epoxidized and hydrogenated, and then the resulting epoxy compounds were respectively cured with methyl nadic anhydride as a curing agent.

The results were as follows:

| Experiment | Ester | Epoxy compound | | | Arc resistance holding time (sec.) | Crack resistance |
|---|---|---|---|---|---|---|
| | | Epoxy value | Hydroxy value | Iodine value | | |
| 7 | *7 | 0.59 | 0.07 | 15 | <100 | Good. |
| 8 | *8 | 0.56 | 0.05 | 18 | <100 | Do. |
| 9 | *9 | 0.49 | 0.03 | 24 | <100 | Do. |

EXAMPLES 10–11

In accordance with the process of Example 1, 2,7-octadienyl - 1 - glycidy ester of tetrahydrophthalic acid(*10) and 2,7 - octadienyl-methyl-glycidyl ester of tetrahydrophthalic acid(*11) were respectively epoxidized and hydrogenated, and then the resulting epoxy compounds were respectively cured with hexahydrophthalic anhydride of 0.90 mole equivalent to the epoxy radical, as a curing agent. The results were as follows:

| Experiment | Ester | Epoxy compound | | | Arc resistance holding time (sec.) | Crack resistance |
|---|---|---|---|---|---|---|
| | | Epoxy value | Hydroxy value | Iodine value | | |
| 10 | *10 | 0.55 | 0.05 | 23 | 150 | Good. |
| 11 | *11 | 0.51 | 0.04 | 21 | 150 | Do. |

EXAMPLE 12

17.4 g. of epoxy compound having an epoxy value of 0.57, a hydroxyl value of 0.05 and an iodine value of 141, was made from di(2,7 - octadienyl - 1)ester of terephthalic acid, in accordance with the process of Example 1. 30 g. of acetone and 0.10 g. of catalyst (2 weight percent of Pt supported on an activated carbon carrier) were charged to an autoclave. After substitution with $N_2$ gas, 25 kg./cm.$^2$ of hydrogen pressure was charged, and the contents were hydrogenated at 22° C. for 2 hours while stirring. An epoxy compound having an epoxy value of 0.52, a hydroxyl value of 0.12 and an iodine value of 24.6 was obtained according to the process of Example 1. 100 parts of the resulting epoxy compound, 60 parts of hexahydrophthalic anhydride and 0.5 part of N,N-dimethylbenzylamine were mixed and cured at 80° C. for 3 hours and then at 120° C. for 3 hours, and further at 160° C. for 10 hours.

The resulting epoxy resin composition showed good crack resistance, and good tracking resistance, as measured by DIP methods, which showed that the composition was durable in 3 kv., 51 cycle, whereas conventional epoxy resins prepared from glycidyl esters of a phthalic ester broke at 3 kv., 1 cycle.

EXAMPLES 13 AND 14

290 g. of di(2,7 - octadienyl - 1)ester of tetrahydrophthalic acid and 1.2 liters of chloroform were charged to a flask and 830 g. of 40% peracetic acid, neutralized with 42.2 g. of sodium acetate, was added dropwise at up to 10° C. and the contents were reacted at 18° C. for 20 hours. The product was washed with 2 liters of water 3 times, and a 10% aqueous solution of acidic sodium sulfite was added to decompose the residual peracetic acid. The chloroform layer was separated, and concentrated and dried in vacuum to yield 331 g. of a colorless viscous liquid having an epoxy value of 0.76, a hydroxy value of 0.07, and an iodine value of 29. 100 parts of said epoxy compound, 60 parts of hexahydrophthalic anhydride, and 0.5 part of N,N-dimethylbenzylamine were cured at 90° C. for 3 hours, and then at 120° C. for 2 hours and further at 160° C. for 3 hours, to give an epoxy resin composition having the following properties.

In comparison, a commercial epoxy compound was cured under the same conditions. The thermal decomposition temperature was measured by a thermobalance. The thermal deformation temperature and bend stength were measured under ASTM D–648 and dielectric constant was measured under ASTM D–150. The weight loss was measured by heating in an oven at 200° C. The tacking resistance was measured by IEC method at 600 v.

| Experiment | Amount of curing agent (equivalent/eqoxy radical) | Thermal decomposition temp. (° C.) | Weight loss 200° C. 1 week (percent) | Thermal deformation temp. (° C.) | Bend strength (kg./cm.$^2$) | Dielectric constant | Arc resistance (sec.) | Tracking resistance (mg.) |
|---|---|---|---|---|---|---|---|---|
| 13 | 0.85 | 340 | 1.0 | 142 | 10.0 | 3.16 | 90 | 3.2 |
| 14 | 0.62 | 340 | 1.5 | 127 | 93–7.7 | 3.3–3.5 | 85 | 3.3 |
| Comparison | 0.80 | 320 | 3.0 | 130 | 60 | 3.5 | 70 | 4.5 |

EXAMPLE 15

The epoxidized product obtained in Example 1 was washed with water, and 210 g. of 40% peracetic acid, neutralized with 10 g. of sodium acetate, was added and further epoxidized at 18° C. for 7 hours in accordance with the process of Example 13. The resulting epoxy compound had an epoxy value of 0.91, a hydroxyl value of 0.10, and an iodine value of 12, and was observed to be a viscous, colorless liquid. The mixture composed of 100 parts of said epoxy compound, 65 parts of hexahydrophthalic anhydride, 25 parts of methyl nadic anhydride and 0.3 part of imidazole were cured at 85° C. for 3 hours and then at 100° C. for 2 hours, and further at 150° C. for 3 hours. An epoxy resin having the following properties was obtained.

Thermal deform. temp. (° C.) _____ 185
Bend strength (kg./cm.$^2$) _____ 12.5–12.7
Dielectric constant (20° C.) _____ 3.00
Arc resist. (sec.) _____ 110
Tracking resist. (mg.) _____ 2.7

EXAMPLES 16, 17

22.0 g. of di(1,7-octadienyl-3) ester of tetrahydrophthalic acid and 100 ml. of methylene dichloride were charged to a flask. To this mixture, 60 g. of 40% peracetic anhydride, neutralized with 5.3 g. of sodium acetate, was added dropwise at 15° C. and reacted at 15° C. for 19 hours. The resulting product was washed with water and then treated with a 10% aqueous solution of acidic sodium sulfite, and washed with water. The chloroform layer was separated, concentrated and dried to yield 230 g. of a viscous, colorless, epoxy compound, having an epoxy value of 0.70, a hydroxyl value of 0.09, and an iodine value of 40.

100 parts of the said epoxy compound, 80 parts of hexahydrophthalic anhydride and 0.5 parts of N,N-dimethylbenzylamine were cured in accordance with the process of Example 15, to yield an epoxy resin composition having the following properties(*16): At the same time, 40 g. of di(2,7-octadienyl-1)ester of bicyclo(2.2,1) heptane dicarboxylic acid, and 200 ml. of methylene dichloride were charged into a flask and 120 g. of 40% peracetic acid neutralized with 4.5 g. of sodium acetate, was added dropwise at a temperature of up to 17° C. and reacted at 17° C. for 20 hours. The process of Example 16 was repeated to yield 44.2 g. of an epoxy compound, having an epoxy value of 0.65, a hydroxyl value of 0.85, and an iodine value of 50. The epoxy compound was cured in accordance with the process of Example 16 to yield a composition having the following properties (*17).

| Experiment | Thermal deformation temp. (° C.) | Bend strength (kg./cm.²) | Dielectric constant (20° C.) | Arc resistance (sec.) | Tracking resistance (mg.) | Heat loss (200° C.) 1 week (percent) |
|---|---|---|---|---|---|---|
| *16 | 141 | 11.0 | 3.20 | 85 | 3.5 | 1.0 |
| *17 | 153 | 10.0 | 3.05 | 90 | 3.1 | 1.2 |

EXAMPLE 18

15.3 g. of di(2,7-octadienyl-1) ester of phthalic acid and 150 g. of chloroform were charged to a flask and 36.6 g. of 36.6% peracetic acid was added dropwise at 35–40° C. After the addition, the contents were stirred for 8 hours and washed with water. 50 ml. of 15% acidic sodium sulfite was added to decompose the residual peracetic acid. The product was washed with water two times and dried, and then chloroform was distilled off to yield an epoxy compound having an epoxy value of 0.68, a hydroxyl value of 0.23 and an iodine value of 22.

The mixture of the above epoxy compound and the same amount of diethylene triamine were heated at 70° C. for 15 hours. The resulting cured epoxy resin composition was found to have a hardness, as measured by GYZJ–935 type hardness-testing machine, of 80–85. The cured composition was unaffected by boiling for 2 hours, and by reflexing in either acetone or butyl acetate for 3 hours.

EXAMPLE 19

An epoxy compound having an epoxy value of 0.63 and a hydroxyl value of 0.23, which was prepared according to the process of Example 18, using di(2,7-octadienyl-1) ester of maleic acid, was cured in acordance with the process of Example 18.

The cured composition was found to have a hardness of 80 and was unaltered even after reflexing in acetone or butyl acetate.

EXAMPLE 20

392 g. of di(2-octenyl-1)ester of hexahydrophthalic acid and 400 ml. of methylene dichloride were charged to a flask, and 41% peracetic acid was added dropwise at up to 30° C., while stirring. After the addition, the contents were reacted at up to 30° C. for 5 hours, and washed with water and then separated. The unreacted peracetic acid, hydrogen peroxide, and acetic acid were removed, and then methylene dichloride was distilled off and dried by heating under a reduced pressure of up to 1 mm. Hg, to yield an epoxy compound, having an epoxy value of 0.40, a hydroxy value of 0.06 and an iodine value of 5.5.

100 parts of said epoxy compound, 50.7 parts of hexahydrophthalic anhydride and 0.5 part of triethylenediamine were mixed and cured with a washer by heating at 120° C. for 4 hours and then at 150° C. for 6 hours. The cured epoxy resin composition was cast without any cracking and had an arc holding time in an arc resistance test of 155 sec.

EXAMPLE 21

390 g. of (2-octenyl-2,7-octadienyl-1) ester of hexahydrophthalic acid and 667 ml. of chloroform were charged to a flask, and 760 g. of 41.5% peracetic acid was added dropwise at up to 30° C. After the addition, the content were reacted at the same temperature for 5 hours, in accordance with the process of Example 20, to yield an epoxy compound having an epoxy value of 0.50, a hydroxyl value of 0.10, and an iodine value of 16. 100 parts of said epoxy compound, 64.7 parts of hexahydrophthalic anhydride and 0.3 part of 2-ethyl-4-methylimidazole were mixed and cured by heating at 120° C. for 4 hours and then at 150° C. for 10 hours. A cast of the composition with a washer was made without cracking. The arc holding time in an arc resistance test was found to be 146 seconds.

Having now fully described the invention, it will be apparent to one of ordinary skill in the art that many changes and modifications can be made thereto without departing from the spirit or scope of the invention. Accordingly,

What is claimed as new and intended to be secured by Letters Patent of the United States is:

1. A cured epoxy resin composition prepared by curing in the presence of a curing agent, or a Lewis acid or base, a composition formed by epoxidizing a diester of a divalent alicyclic carboxylic acid wherein at least one ester functionality of said diester is formed with an octadienol selected from the group consisting of 2,7-octadienol-1, and 1,7-octadienol-3. fi 2. The epoxy composition of claim 1, wherein both ester functionalities of said diester are formed with octadienols selected from the group consisting of 2,7-octadienol-1 and 1,7-octadienol-3.

3. The epoxy composition of claim 1, wherein said acid is tetrahydrophthalic acid, hexahydrophthalic acid, nadic acid, methylnadic acid, dihydronadic acid, or methyldihydronadic acid.

4. A cured epoxy resin composition prepared by curing in the presence of a curing agent, or a Lewis acid or base, a composition formed by epoxidizing a diester of a divalent alicyclic carboxylic acid and by hydrogenating said epoxidized diester, wherein at least one ester functionality of said diester is formed with an octadienol alcohol component selected from the group consisting of 2,7-octadienol-1 and 1,7-octadienol-3.

References Cited

UNITED STATES PATENTS

| 3,328,483 | 6/1967 | Enthoven et al. | 260—837 |
| 3,242,145 | 3/1966 | Martin | 260—78.4 |
| 3,117,099 | 1/1964 | Proops | 260—18 |
| 3,288,761 | 11/1966 | Nikles et al. | 260—78.4 |
| 2,772,296 | 11/1956 | Mueller | 260—348 |
| 3,629,204 | 12/1971 | Yoshihara et al. | 260—78.4 EP |

JOSEPH L. SCHOFER, Primary Examiner

J. KIGHT, Assistant Examiner

U.S. Cl. X.R.

260—2 EC, EA, 348 A

UNITED STATES PATENT OFFICE
CERTIFICATE OF CORRECTION

Patent No. 3,790,532            Dated February 5, 1974

Inventor(s) Hideo Fukutani et al.

It is certified that error appears in the above-identified patent and that said Letters Patent are hereby corrected as shown below:

Insert the name of one of the inventors:

-- Nobukatu Wakabayashi, Kanagawa-ken, Japan --.

Signed and sealed this 17th day of September 1974.

(SEAL)
Attest:

McCOY M. GIBSON JR.            C. MARSHALL DANN
Attesting Officer              Commissioner of Patents